United States Patent
Kuo et al.

(10) Patent No.: US 11,310,423 B2
(45) Date of Patent: Apr. 19, 2022

(54) IMAGE CAPTURING METHOD AND IMAGE CAPTURING APPARATUS

(71) Applicant: Industrial Technology Research Institute, Hsinchu (TW)

(72) Inventors: Hui-Ping Kuo, Hsinchu (TW); Guo-Ruei Chen, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 261 days.

(21) Appl. No.: 16/729,507

(22) Filed: Dec. 30, 2019

(65) Prior Publication Data
US 2021/0185230 A1   Jun. 17, 2021

(30) Foreign Application Priority Data
Dec. 16, 2019 (TW) ................................ 108145972

(51) Int. Cl.
*H04N 5/232* (2006.01)
*G05D 1/00* (2006.01)
(Continued)

(52) U.S. Cl.
CPC ....... *H04N 5/23267* (2013.01); *B64C 39/024* (2013.01); *B64D 47/08* (2013.01);
(Continued)

(58) Field of Classification Search
CPC .............. H04N 5/23267; H04N 5/2328; B64C 39/024; B64C 2201/123; B64C 2201/127; B64D 47/08; G05D 1/0038; G05D 1/101
See application file for complete search history.

(56) References Cited

U.S. PATENT DOCUMENTS

| 5,434,617 A | 7/1995 | Bianchi |
| 6,437,819 B1 | 8/2002 | Loveland |

(Continued)

FOREIGN PATENT DOCUMENTS

| CN | 1968405 | 5/2007 |
| CN | 101572804 | 11/2009 |

(Continued)

OTHER PUBLICATIONS

"Timestamp", Aug. 2019, Wikipedia, retrieved Nov. 3, 2021, https://en.wikipedia.org/w/index.php?title=Timestamp&oldid=911980128 (Year: 2019).*

(Continued)

*Primary Examiner* — Peter D Nolan
*Assistant Examiner* — Kenneth M Dunne
(74) *Attorney, Agent, or Firm* — JCIPRNET

(57) ABSTRACT

An image capturing method and an image capturing apparatus are provided. An inspection region image of an inspection region is captured by a first image capturing device at a first time point. A control signal is received at a second time point after the first time point. A relative translation relationship and/or a relative rotation relationship of the first image capturing device at the first time point and a second image capturing device at a second time point are calculated. A first three-dimensional coordinate value of the local region relative to the first image capturing device is calculated and the first three-dimensional coordinate value is transformed to a second three-dimensional coordinate value relative to the second image capturing device according to the relative translation relationship and the relative rotation relationship. The second image capturing device is driven to rotate. A local region image of the local region is captured.

14 Claims, 8 Drawing Sheets

(51) Int. Cl.
  B64D 47/08 (2006.01)
  G05D 1/10 (2006.01)
  B64C 39/02 (2006.01)

(52) U.S. Cl.
  CPC ........... G05D 1/0038 (2013.01); G05D 1/101 (2013.01); H04N 5/2328 (2013.01); B64C 2201/123 (2013.01); B64C 2201/127 (2013.01)

(56) References Cited

U.S. PATENT DOCUMENTS

| | | | |
|---|---|---|---|
| 7,450,735 | B1 | 11/2008 | Shah et al. |
| 7,522,186 | B2 | 4/2009 | Arpa et al. |
| 7,576,836 | B2 | 8/2009 | Bridges |
| 7,768,571 | B2 | 8/2010 | Kim et al. |
| 8,180,107 | B2 | 5/2012 | Broaddus et al. |
| 9,143,759 | B2 | 9/2015 | Choi et al. |
| 9,164,506 | B1 | 10/2015 | Zang |
| 9,253,460 | B1 * | 2/2016 | Wang ................. B64C 39/024 |
| 9,555,897 | B2 | 1/2017 | Eline et al. |
| 10,474,152 | B2 * | 11/2019 | Falk-Pettersen ..... G05D 1/0016 |
| 10,690,525 | B2 * | 6/2020 | Zhao ...................... G01S 17/86 |
| 10,721,404 | B1 * | 7/2020 | Battocchi ............. H04N 5/2329 |
| 10,796,425 | B1 * | 10/2020 | Patel .................... B64C 39/024 |
| 10,802,479 | B2 * | 10/2020 | Li .......................... G08C 17/00 |
| 11,016,509 | B2 * | 5/2021 | Iwakura .................. B60R 11/04 |
| 11,048,277 | B1 * | 6/2021 | Zhu .......................... G05D 1/12 |
| 2006/0203090 | A1 | 9/2006 | Wang et al. |
| 2007/0286456 | A1 | 12/2007 | Ariyur et al. |
| 2008/0201101 | A1 * | 8/2008 | Hebert ............... G01B 11/2513 702/152 |
| 2009/0167867 | A1 | 7/2009 | Lin et al. |
| 2011/0310219 | A1 | 12/2011 | Kim et al. |
| 2014/0270744 | A1 * | 9/2014 | Webb ................. H04N 5/23261 396/55 |
| 2016/0198088 | A1 * | 7/2016 | Wang ................. H04N 5/23264 348/36 |
| 2016/0368602 | A1 | 12/2016 | Zhang |
| 2017/0010623 | A1 * | 1/2017 | Tang ........................ G01C 3/00 |
| 2017/0045807 | A1 * | 2/2017 | Ye .......................... F16M 11/08 |
| 2017/0067734 | A1 * | 3/2017 | Heidemann ......... G01C 15/002 |
| 2017/0163896 | A1 * | 6/2017 | Kang ................. B64C 39/024 |
| 2018/0046187 | A1 * | 2/2018 | Martirosyan ........... G06T 7/292 |
| 2018/0157253 | A1 * | 6/2018 | Margolin ............. G05D 1/0038 |
| 2019/0068829 | A1 * | 2/2019 | Van Schoyck ....... G01C 21/165 |
| 2019/0094149 | A1 * | 3/2019 | Troy .................... G05D 1/0038 |
| 2019/0096069 | A1 | 3/2019 | Qian et al. |
| 2019/0147619 | A1 * | 5/2019 | Goldman .............. B64C 39/024 382/154 |
| 2019/0206073 | A1 * | 7/2019 | Huang ................. H04N 13/239 |
| 2020/0097026 | A1 * | 3/2020 | Guo ...................... G05D 1/0808 |
| 2021/0110137 | A1 * | 4/2021 | Kerzner ................ B64C 39/024 |
| 2022/0012493 | A1 * | 1/2022 | Madden ............. G01C 21/3852 |

FOREIGN PATENT DOCUMENTS

| | | | |
|---|---|---|---|
| CN | 101860732 | 10/2010 | |
| CN | 102342099 | 2/2012 | |
| CN | 104197928 | 12/2014 | |
| JP | 2010124399 | 6/2010 | |
| JP | 2017055325 | 3/2017 | |
| JP | 2018040992 | 3/2018 | |
| TW | 200903386 | 1/2009 | |
| TW | 201915582 | 4/2019 | |
| TW | 201926240 | 7/2019 | |
| WO | WO-2017128050 A1 * | 8/2017 | ............. H04N 7/181 |
| WO | WO-2017187220 A1 * | 11/2017 | ........... G05D 1/0038 |
| WO | WO-2018167006 A1 * | 9/2018 | ........... B64C 39/024 |

OTHER PUBLICATIONS

G. Scotti et al., "A novel dual camera intelligent sensor for high definition 360 degrees surveillance", IEE Intelligent Distributed Surveillance Systems, Feb. 23-23, 2004, pp. 26-30.

Chin E. Lin et al., "Camera Gimbal Tracking from UAV Flight Control", 2014 CACS International Automatic Control Conference (CACS 2014), Nov. 26-28, 2014, pp. 319-322.

Huang-Chia Shih et al., "Collaborative Real-Time Scheduling for Multiple Objects Tracking in PTZ Camera Network", Intelligent Signal Processing and Communications Systems (ISPACS 2012), Nov. 4-7, 2012, pp. 166-171.

Jeng-Sheng Yeh et al., "Cooperative Dual Camera Surveillance System for Real-Time Object Searching and Close-Up Viewing", 2016 2nd International Conference on Intelligent Green Building and Smart Grid (IGBSG), Jun. 27-29, 2016, pp. 1-5.

I. Everts et al., "Cooperative Object Tracking with Multiple PTZ Cameras", 14th International Conference on Image Analysis and Processing (ICIAP 2007), Sep. 10-14, 2007, pp. 1-6.

Raul Mur-Artal et al., "ORB-SLAM: A Versatile and Accurate Monocular SLAM System", IEEE Transactions on Robotics, vol. 31, No. 5, Aug. 24, 2015, pp. 1-18.

Michael Bloesch et al., "Robust visual inertial odometry using a direct EKF-based approach", 2015 IEEE/RSJ International Conference on Intelligent Robots and Systems (IROS), Sep. 28-Oct. 2, 2015, pp. 1-8.

Christian Forster et al., "SVO: Fast semi-direct monocular visual odometry", 2014 IEEE International Conference on Robotics and Automation (ICRA), May 31-Jun. 7, 2014, pp. 1-8.

Yiliang Xu et al., "Systems and algorithms for autonomously simultaneous observation of multiple objects using robotic PTZ cameras assisted by a wide-angle camera", 2009 IEEE/RSJ International Conference on Intelligent Robots and Systems, Oct. 10-15, 2009, pp. 3802-3807.

"Office Action of Taiwan Counterpart Application", dated Sep. 26, 2020, pp. 1-6.

"Office Action of Japan Counterpart Application", dated Apr. 27, 2021, p. 1-p. 2.

* cited by examiner

IMAGE CAPTURING METHOD AND IMAGE CAPTURING APPARATUS

CROSS REFERENCE TO RELATED APPLICATION

This application claims the priority benefit of Taiwan application serial no. 108145972, filed on Dec. 16, 2019. The entirety of the above-mentioned patent application is hereby incorporated by reference herein and made a part of specification.

TECHNICAL FIELD

The disclosure relates to an image processing method and an image processing apparatus, and more particularly to an image capturing method and an image capturing apparatus.

BACKGROUND

Nowadays, the use of an image capturing apparatus mounted on a flying vehicle to capture images of targets has become a technology and an application that has received considerable attention. Unmanned Aerial Vehicle (UAV) can capture images of targets from a more suitable viewing angle with the ability to stay in the air. Based on the image capturing method, image transmission technology can be integrated to develop remote inspection (such as bridge in section, reservoirs, and/or other large structures) through the means of tele-operating photographing. However, there is a time delay in the signal transmission between the control terminal and the UAV, and during this time delay, the pose of the UAV is susceptible to environmental factors such as wind and/or mechanical vibrations, causing the image to shift, and as a result it may be difficult to get a correct zoomed and focused image.

SUMMARY

The disclosure provides an image capturing method and an image capturing apparatus, which can perform image capturing on a target.

The image capturing method of the disclosure includes the following steps. An inspection region image of an inspection region is captured by a first image capturing device at a first time point. A control signal is received at a second time point after the first time point. The control signal corresponds to a local region in the inspection region image. A processing unit is used to calculate at least one of a relative translation relationship and a relative rotation relationship between the first image capturing device at the first time point and a second image capturing device at a second time point. The processing unit is used to calculate a first three-dimensional coordinate value of the local region relative to the first image capturing device according to the control signal, and the first three-dimensional coordinate value is transformed to a second three-dimensional coordinate value relative to the second image capturing device according to at least one of the relative translation relationship and the relative rotation relationship. A driving unit is used to drive the second image capturing device to rotate with a rotation amount according to the second three-dimensional coordinate value. The second image capturing device is used to capture a local region image corresponding to the local region.

In an embodiment of the disclosure, the first image capturing device and the second image capturing device are mounted on a flying vehicle, and the steps of calculating at least one of the relative translation relationship and the relative rotation relationship include: calculating at least one of the relative translation relationship and the relative rotation relationship based on at least one of the relative position and relative angle of the first image capturing device and the second image capturing device on the flying vehicle according to at least one of the translation amount and rotation amount of the flying vehicle from the first time point to the second time point.

In an embodiment of the disclosure, the first image capturing device is mounted on a main rigid body of a flying vehicle, and the second image capturing device is mounted on a self-stabilized device of the flying vehicle. The self-stabilized device is adapted to generate a compensated rotation amount according to a partial rotation amount of the main body, wherein the step of calculating at least one of the relative translation relationship and the relative rotation relationship further includes: calculating the relative translation relationship and the relative rotation relationship according to the compensated rotation amount.

In an embodiment of the disclosure, the step of calculating the first three-dimensional coordinate value includes: estimating the distance between the first image capturing device at the first time point and the point in the local region along the axis perpendicular to the image plane coordinate system as the estimated distance value. The first three-dimensional coordinate value of the point in the local region relative to the first image capturing device is calculated according to the estimated distance value and the coordinate value of the point in the local region in the image plane coordinate system.

In an embodiment of the disclosure, the above-mentioned image capturing method further includes an image feature matching step, and the image feature matching step includes: storing the inspection region image at the first time point through a first image temporary storage unit, storing the local region image at the second time point through a second image temporary storage unit; determining, through the processing unit, whether the image correspondence between the inspection region image in the first image temporary storage unit and the local region image at the second time point in the second image temporary storage unit is greater than a threshold.

In an embodiment of the disclosure, the above-mentioned image capturing method further includes a correction step, wherein the correction step includes: when the image correspondence between the inspection region image in the first image temporary storage unit and the local region image at the second time point in the second image temporary storage unit is smaller than a threshold, the processing unit is used to correct the estimated distance value. The first three-dimensional coordinate value is corrected according to the corrected estimated distance value and the coordinate value of the point in the local region in the image plane coordinate system. The second three-dimensional coordinate value is corrected based on the corrected first three-dimensional coordinate value. The processing unit is used to determine a correction rotation amount according to the corrected second three-dimensional coordinate value, and instruct the driving unit to rotate the second image capturing device according to the correction rotation amount.

In an embodiment of the disclosure, the above-mentioned image capturing method further includes: capturing another local region image inside the local region through the second image capturing device at a third time point; storing the local region image through the first image temporary storage unit, storing another local region image through the second image temporary storage unit; calculating, through the processing unit, another image correspondence between the second image capturing device at the second time point and the second image capturing device at the third time point following the second time point so as to calculate at least one of another relative translation relationship and another relative rotation relationship; determining, through the processing unit, whether the image correspondence between the local region image in the first image temporary storage unit and another local region image in the second image temporary storage unit is greater than a threshold; determining another correction rotation amount through the processing unit according to at least one of another relative translation relationship and another relative rotation relationship of the second image capturing device, and according to whether the image correspondence between the local region image in the first image temporary storage unit and another local region image in the second image temporary storage unit is greater than a threshold; instructing the driving unit to rotate the second image capturing device according to another correction rotation amount.

In an embodiment of the disclosure, the above-mentioned image capturing method further includes a correction step, wherein the correction step includes: when the image correspondence between the inspection region image in the first image temporary storage unit and the local region image at the second time point in the second image temporary storage unit is greater than or equal to the threshold, the processing unit is used to calculate a distance from a center of a corresponding local region in the local region image to a center of the local region image to determine a correction rotation amount, and instruct the driving unit to rotate the second image capturing device according to the correction rotation amount, wherein the corresponding local region in the local region image is a region in the local region where the image correspondence is greater than or equal to the threshold.

In an embodiment of the disclosure, the step of calculating the first three-dimensional coordinate value includes: calculating, by the processing unit, the first three-dimensional coordinate value of the local region relative to the first image capturing device according to a coordinate value of the local region in an image plane coordinate system.

In an embodiment of the disclosure, the above-mentioned control signal includes a timestamp corresponding to the first time point and an image feature of the local region.

The image capturing apparatus of the disclosure includes a first image capturing device, a second image capturing device, a processing unit and a driving unit. The first image capturing device is adapted to capture an inspection region image of an inspection region at a first time point. The processing unit is adapted to calculate at least one of a relative translation relationship and a relative rotation relationship between the first image capturing device at the first time point and the second image capturing device at the second time point, and the processing unit is adapted to receive a control signal at a second time point following the first time point. The control signal corresponds to a local region in the inspection region image. The processing unit is adapted to calculate a first three-dimensional coordinate value of the local region relative to the first image capturing device according to the control signal, and convert the first three-dimensional coordinate value to a second three-dimensional coordinate value relative to the second image capturing device at the second time point according to at least one of the relative translation relationship and the relative rotation relationship. The driving unit is adapted to drive the second image capturing device to rotate with a rotation amount according to the second three-dimensional coordinate value, wherein after the driving unit drives the second image capturing device to rotate with the rotation amount, the second image capturing device is adapted to capture a local region image of the local region.

In an embodiment of the disclosure, the above-mentioned image capturing apparatus includes a flying vehicle, wherein the first image capturing device and the second image capturing device are mounted on the flying vehicle. The processing unit is adapted to calculate at least one of the relative translation relationship and the relative rotation relationship based on at least one of the relative position and relative angle of the first image capturing device and the second image capturing device on the flying vehicle according to at least one of the translation amount and rotation amount of the flying vehicle from the first time point to the second time point.

In an embodiment of the disclosure, the above-mentioned flying vehicle includes a main body and a self-stabilized device. The first image capturing device is mounted on the main rigid body, and the second image capturing device is mounted on the self-stabilized device. The self-stabilized device is adapted to generate a rotation amount to compensate a partial rotation amount of the main body, wherein the processing unit is adapted to calculate at least one of the relative translation relationship and the relative rotation relationship according to the compensated rotation amount.

In an embodiment of the disclosure, the processing unit is adapted to estimate a distance between the first image capturing device at the first time point and the point in the local region along the axis perpendicular to the image plane coordinate system as the estimated distance value, and is adapted to calculate the first three-dimensional coordinate value of the point in the local region relative to the first image capturing device according to the estimated distance value and the coordinate value of the point in the local region in the image plane coordinate system.

In an embodiment of the disclosure, the above-mentioned image capturing apparatus further includes a first image temporary storage unit and a second image temporary storage unit, wherein the first image temporary storage unit is adapted to store an inspection region image at a first time point, the second image temporary storage unit is adapted to store the local region image at the second time point. The processing unit is adapted to determine whether the image correspondence between the inspection region image in the first image temporary storage unit and the local region image at the second time point in the second image temporary storage unit is greater than a threshold.

In an embodiment of the disclosure, when the image correspondence between the inspection region image in the first image temporary storage unit and the local region image at the second time point in the second image temporary storage unit is smaller than the threshold, the processing unit is adapted to correct the estimated distance value according to a comparison result, is adapted to correct the first three-dimensional coordinate value according to the corrected estimated distance value and the coordinate value of the point in the local region in the image plane coordinate system, and is adapted to correct the second three-dimensional coordinate value based on the corrected first three-dimensional coordinate value. Moreover, the processing unit is adapted to determine a correction rotation amount according to the corrected second three-dimensional coordinate value, and the driving unit is adapted to rotate the second image capturing device according to the correction rotation amount.

In an embodiment of the disclosure, the second image capturing device is adapted to capture another local region image inside the local region at a third time point; the first image temporary storage unit is adapted to store the local region image; the second image temporary storage unit is adapted to store another local region image; the processing unit is adapted to calculate at least one of another relative translation relationship and another relative rotation relationship between the second image capturing device at the second time point and the second image capturing device at the third time point following the second time point; the processing unit is adapted to determine whether the image correspondence between the local region image in the first image temporary storage unit and another local region image in the second image temporary storage unit is greater than a threshold; the processing unit is adapted to determine another correction rotation amount according to at least one of another relative translation relationship and another relative rotation relationship of the second image capturing device, and according to whether the image correspondence between the local region image in the first image temporary storage unit and another local region image in the second image temporary storage unit is greater than the threshold, and to further instruct the driving unit to rotate the second image capturing device according to another correction rotation amount.

In an embodiment of the disclosure, when the image correspondence between the inspection region image in the first image temporary storage unit and the local region image at the second time point in the second image temporary storage unit is greater than or equal to the threshold, the above processing unit is adapted to calculate a distance from a center of a corresponding local region in the local region image to a center of the local region image to determine a correction rotation amount, and the driving unit is adapted to rotate the second image capturing device according to the correction rotation amount, wherein the corresponding local region in the local region image is a region in the local region where the image correspondence is greater than or equal to the threshold.

In an embodiment of the disclosure, the processing unit is adapted to calculate a first three-dimensional coordinate value of the local region relative to the first image capturing device according to a coordinate value of the local region in an image plane coordinate system.

In an embodiment of the disclosure, the above-mentioned control signal includes a timestamp corresponding to the first time point and an image feature of the local region.

DESCRIPTION OF EMBODIMENTS

Figure 1:
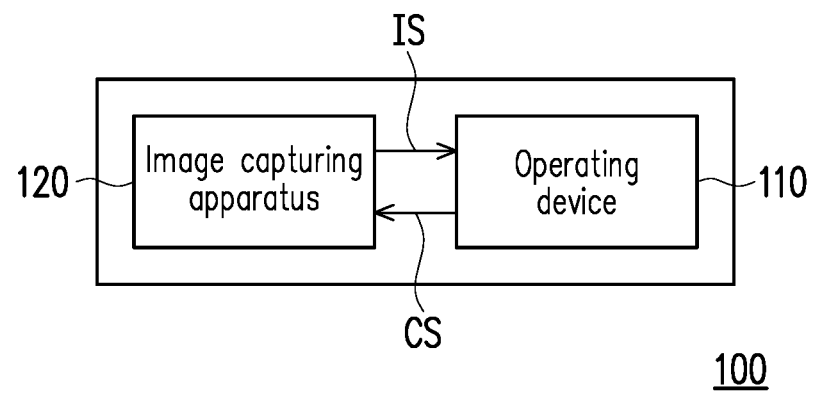
FIG. 1 is a schematic block diagram of an image capturing system according to an embodiment of the disclosure.
Figure 2:
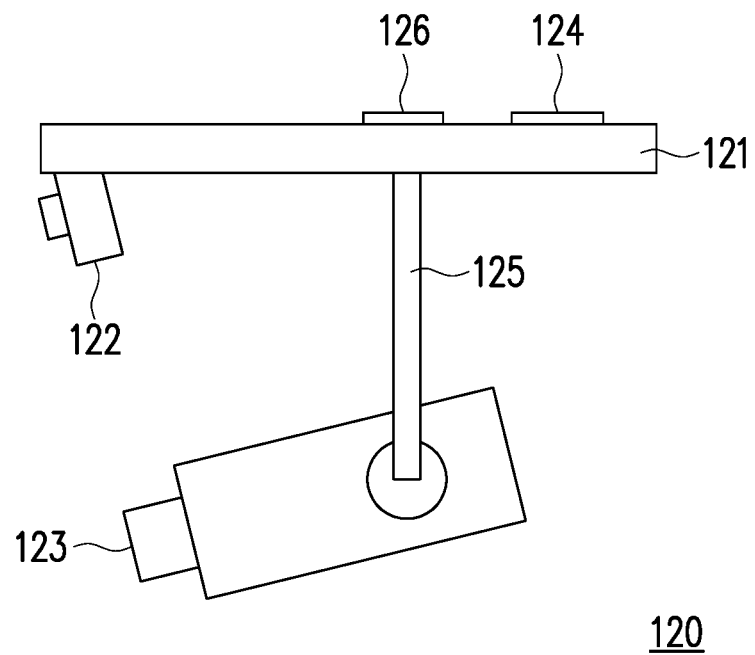
FIG. 2 is a schematic side view of the image capturing apparatus of FIG. 1.

FIG. 1 is a schematic block diagram of an image capturing system according to an embodiment of the disclosure. FIG. 2 is a schematic side view of an image capturing apparatus of FIG. 1. Please refer to FIG. 1 and FIG. 2. The image capturing system 100 in this embodiment includes an operating device 110 and an image capturing apparatus 120. In an embodiment, the image capturing apparatus 120 is an unmanned vehicle, such as an Unmanned Aerial Vehicle (UAV), an autonomous vehicle, a robot, or a mechanical device. In another embodiment, the image capturing apparatus 120 is a removable or non-removable device. In an embodiment, the operating device 110 is implemented through a remote device, for example, a computer, a server, or a remote control device. The operating device 110 may include a screen that can display an image captured by the image capturing apparatus 120 and/or a local region in the image. In an embodiment, the remote device can also be configured to remotely control the image capturing apparatus 120. In an embodiment, the image capturing apparatus 120 and the remote device are located at different positions or locations, but the disclosure is not limited thereto. In another embodiment, the image capturing apparatus 120 and the remote device may also be located at the same position or location. The image capturing apparatus 120 includes a main rigid body 121, a first image capturing device 122, a second image capturing device 123, a processing unit 124, a driving unit 125, and an inertial sensing device 126.

The first image capturing device 122 is, for example, a wide-angle camera and is mounted on the main rigid body 121 to capture a wide-angle image of the inspection region. This wide-angle image is transmitted to the operating device 110 with an image signal IS through the processing unit 124 disposed on the main rigid body 121. In an embodiment, the main rigid body 121 is a rigid main body which is not easily or does not become deformed. In an embodiment, the image signal IS is transmitted to the operating device 110 through wireless communication. In an embodiment, the user may select the target to be inspected (or the operating device 110 selects the target to be inspected according to setting or image detection) from the wide-angle image displayed by the operating device 110, and the operating device 110 generates an instruction related to the target to be inspected accordingly. The instruction is transmitted to the processing unit 124 in the form of a control signal CS. In an embodiment, the control signal CS is transmitted to the processing unit 124 through wireless communication. The processing unit 124 executes calculation related to the translation amount and/or rotation amount of the first image capturing device 122 and the second image capturing device 123 according to the instruction, and then controls the second image capturing device 123 to rotate to correctly face the target to be inspected. The instruction includes a timestamp corresponding to the time point of the wide-angle image, and/or the image feature, coordinates, and/or range of the target to be inspected (that is, the local region A described later). The processing unit 124 may include circuits and electrical components with functions such as signal transmission, calculation, and information storage. In an embodiment, the processing unit 124 includes a processor, a wireless transceiver and/or a control circuit. The disclosure provides no limitation to the composition and form of the processing unit 124.

The second image capturing device 123 is, for example, a telescope camera and is mounted on the driving unit 125, and is configured to turn to the corresponding inspection region according to the calculation result of the processing unit 124 based on the instruction of the control signal CS, and to capture the spot image of the target to be inspected in the inspection region. In an embodiment, the inertial sensing device 126 is configured to sense the translation amount and/or rotation amount of the main rigid body 121, for example, to sense the translation amount and/or rotation amount of the main rigid body 121 of the UAV generated due to wind, mechanical vibration or other factors during its stagnation in the air. The driving unit 125 is, for example, a self-stabilized device connected to the main rigid body 121 and is adapted to generate a compensation translation amount and/or a compensated rotation amount according to the translation amount and/or the rotation amount of the main rigid body 121, such that the second image capturing device 123 can keep facing to heading direction. In an embodiment, the inertial sensing device 126 and/or the driving unit 125 can be integrated as one device. In an embodiment, the inertial sensing device 126 and/or the driving unit 125 is, for example, a self-stabilized gimbal. In an embodiment, the inertial sensing device 126 may be disposed on the main rigid body 121 and coupled to the processing unit 124 through wiring and/or circuits.

Figure 3A:
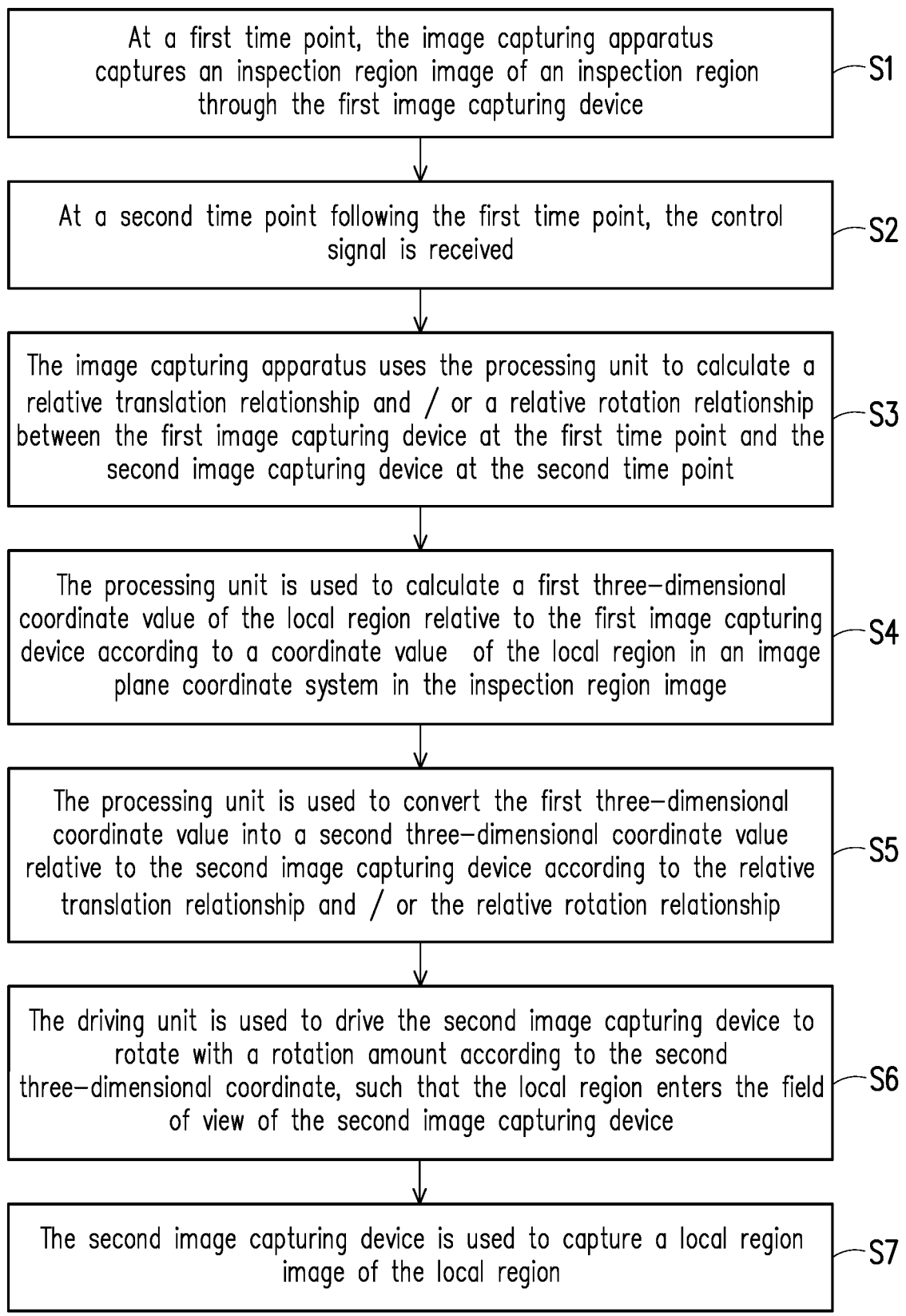
FIG. 3A is a flowchart of an image capturing method according to an embodiment of the disclosure.

The following takes an image capturing apparatus 120 in the image capturing system 100 of FIG. 1 as an example to describe an image capturing method according to an embodiment of the disclosure. FIG. 3A is a flowchart of an image capturing method according to an embodiment of the disclosure. This image capturing method can be executed through the image capturing apparatus 120 shown in FIG. 1. Please refer to FIG. 3A. First, at a first time point, the image capturing apparatus 120 captures an inspection region image I1 of an inspection region through the first image capturing device 122 (step S1). At a second time point following the first time point, the control signal CS is received by the processing unit 124 (step S2). The processing unit 124 is used to calculate a relative translation relationship and/or a relative rotation relationship between the first image capturing device 122 at the first time point and the second image capturing device 123 at the second time point (step S3). The processing unit 124 is used to calculate a first three-dimensional coordinate value of the local region A relative to the first image capturing device 122 according to a coordinate value (u, v) of the local region A in an image plane coordinate system TC in the inspection region image I1 (step S4). The processing unit 124 is used to convert the first three-dimensional coordinate value into a second three-dimensional coordinate value relative to the second image capturing device 123 according to the relative translation relationship and/or the relative rotation relationship (step S5). The driving unit 125 is used to drive the second image capturing device 123 to rotate with a rotation amount according to the second three-dimensional coordinate, such that the local region A enters the field of view of the second image capturing device 123 (step S6). The second image capturing device 123 is used to capture a local region image I2 of the local region A (step S7).

In detail, in step S1, the processing unit 124 transmits the inspection region image I1 captured by the first image capturing device 122 and a timestamp corresponding to the first time point of the inspection region image I1 to the operating device 110. In an embodiment, after the image capturing apparatus 120 captures the inspection region image (or after each inspection region image is captured, or every same time interval), the corresponding timestamp, the translation amount and/or rotation amount sensed by the inertial sensing device 126, the compensation translation amount and/or compensated rotation amount of the driving unit 125, and/or the position and/or the direction of the image capturing apparatus 120 are stored in the storage device (not shown) of the image capturing apparatus 120. The storage device is, for example, a non-volatile memory (such as a hard disk drive or solid state drive) or volatile memory (such as random access memory or register).

In step S2, the operating device 110 returns a control signal CS corresponding to the image signal IS, and the processing unit 124 of the image capturing apparatus 120 receives the control signal CS. The control signal CS corresponds to the signal of the local region A to be inspected in the inspection region image I1. In an embodiment, the control signal CS is a corresponding signal generated by the operating device 110 according to the local region A to be inspected, which is selected by a user, in the inspection region image I1. The control signal CS includes the image features, coordinates and/or range of the local region A as well as a timestamp corresponding to the first time point. The processing unit 124 may obtain the image features, coordinates, and/or range of the local region A as well as the photographing time point of the inspection region image I1 corresponding to the first time point according to the information of the control signal CS. In an embodiment, the inspection region image I1 is captured at the first time point, and after a time delay of transmission to the operating device 110 and the time taken to select the local region, and then the control signal CS is transmitted to the image capturing apparatus 120. Thereafter, the image capturing apparatus 120 receives the control signal CS at the second time point.

Figure 4:
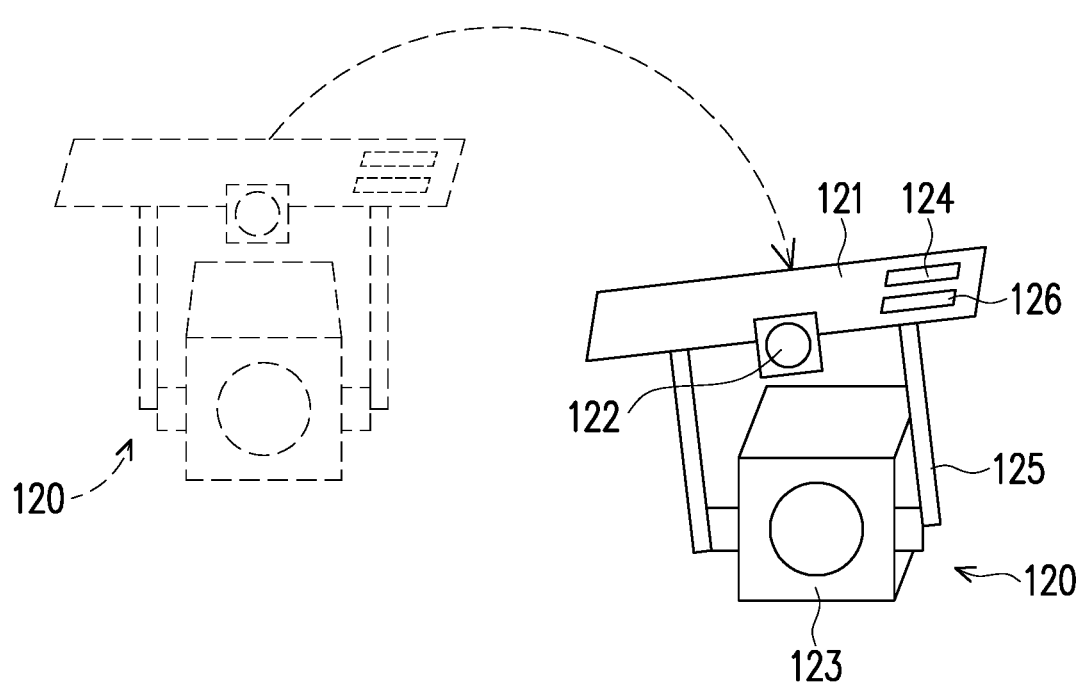
FIG. 4 illustrates that the image capturing apparatus of FIG. 2 generates translation and/or rotation from a first time point to a second time point.

In step S3, the processing unit 124 determines the first time point according to the timestamp corresponding to the first time point in the control signal CS, and further determines the translation amount and/or rotation amount between the first image capturing device 122 at the first time point and the second image capture device 123 at the second time point. Please refer to FIG. 4. FIG. 4 illustrates that the image capturing apparatus 120 (in FIG. 2) generates translation and/or rotation from the first time point to the second time point, wherein the dashed line corresponds to the first time point, the solid line corresponds to the second time point, and the second time point is later than the first time point. From the first time point to the second time point, the image capturing apparatus 120 may exist a translation amount and/or a rotation amount due to wind, mechanical vibration, and/or other factors. The driving unit 125 may drive the second image capturing device 123 to move and/or rotate correspondingly, as shown in FIG. 4, to compensate for the translation amount and/or rotation amount. In another embodiment, the image capturing apparatus 120 may also generate the translation amount and/or rotation amount due to flying to another position. Therefore, the second image capturing device 123 at the second time point has a translation amount and/or a rotation amount relative to the first image capturing device 122 at the first time point, and the processing unit 124 can be used to calculate the translation amount and/or rotation amount according to detection of the inertial sensing device 126.

Figure 5:
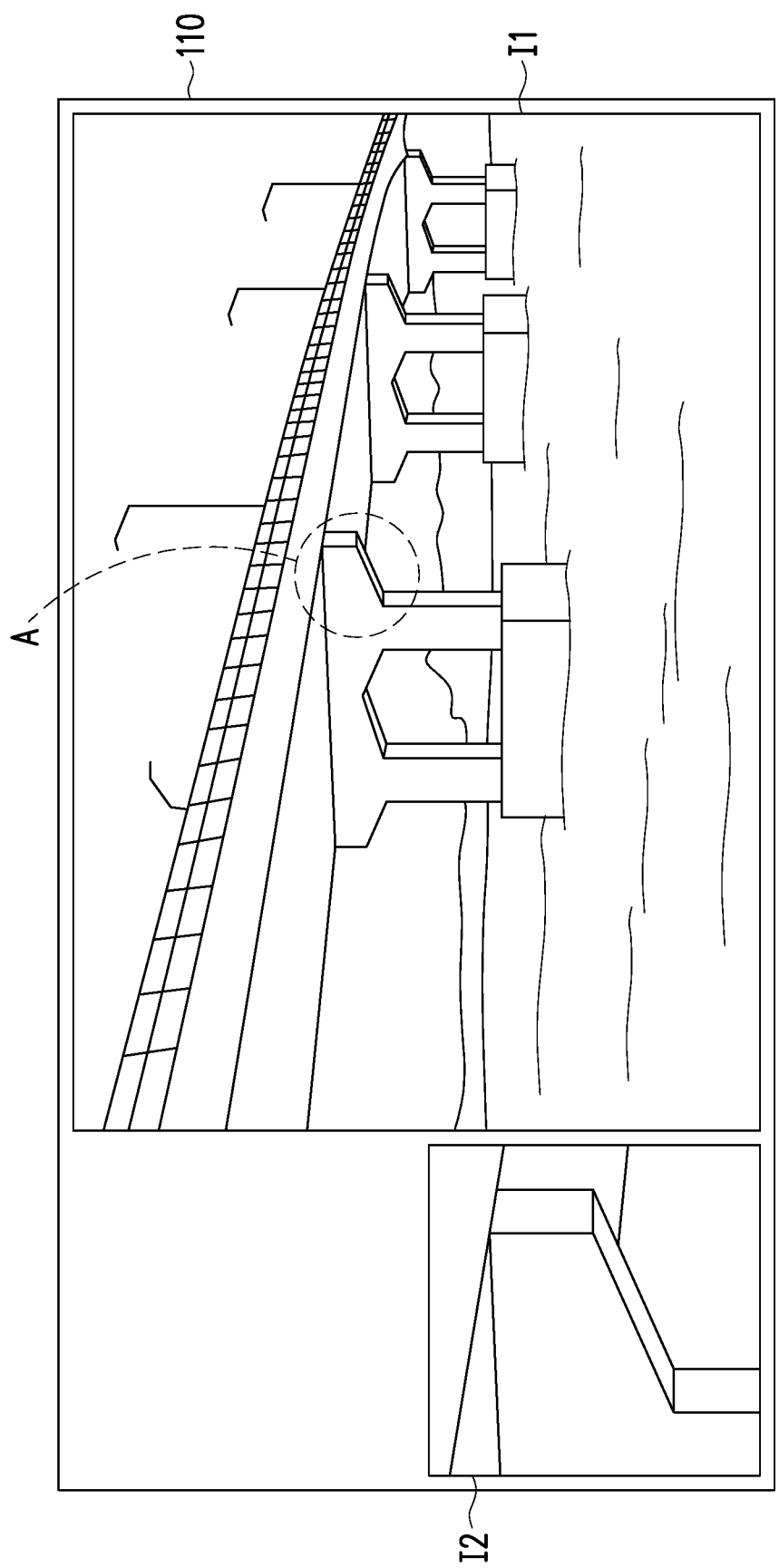
FIG. 5 illustrates an image displayed on the screen of an operating device of FIG. 1.

Please refer to FIG. 5. FIG. 5 illustrates an image displayed on the screen of an operating device 110 of FIG. 1. In the embodiment, the screen of the operating device 110 displays the inspection region image I1, the local region A, and a local region image I2. The user selects the local region A to be inspected according to the inspection region image I1, which is captured at the first time point by the first image capturing device 122, to generate a corresponding control signal CS. The image capturing apparatus 120 receives the control signal CS at the second time point, and then captures an image containing the image features of the local region A to be inspected at the second time point through the second image capturing device 123. In an embodiment, from the first time point to the second time point, the image capturing apparatus 120 generates a translation amount and/or a rotation amount. In addition, since the user captures an image through the second image capturing device 123 based on the image captured by the first image capturing device 122, there is a relative translation relationship T and a relative rotation relationship R between the first image capturing device 122 at the first time point and the second image capturing device 123 at the second time point. In an embodiment, the relative translation relationship T includes a relative position Ts and a dynamic translation Td, and the relative rotation relationship R includes a relative angle Rs and a dynamic relative angle Rd. The relative position Ts and the relative angle Rs may be the static relative relationship between the first image capturing device 122 and the second image capturing device 123, which is, for example, obtained by making the first image capturing device 122 and the second image capturing device 123 to take the same calibration pattern and calculating the comparison of patterns when the main rigid body 121 is in a horizontal state and the second image capturing device 123 is in a centered state. In other words, the relative translation Ts and the relative rotation Rs may be the static pose difference and their photographing angle difference between the installed positions of the first image capturing device 122 and the second image capturing device 123 without any rotation. The dynamic translation Td and the dynamic relative angle Rd may be a dynamic translation amount and a dynamic rotation amount of the image capturing apparatus 120, which are, for example, obtained according to the relative relationship between the position and angle of the image capturing apparatus 120 corresponding to first time point and the position and angle of the image capture apparatus 120 corresponding to the second time point. In an embodiment, the dynamic translation Td and the dynamic relative rotation Rd may be the dynamic pose difference and photographing angle difference of the main rigid body 121 between the first time point and the second time point, such as the pose variation of the image capturing apparatus 120, or inclination of the image capturing apparatus 120 caused by wind. In an embodiment, the processing unit 124 not only can determine the dynamic relative angle Rd of the main rigid body 121, but also can determine the compensated rotation amount Re that is generated by the driving unit 125 for compensating some rotation amount on some of partial axis of the main rigid body 121 from the first time point to the second time point, such as the rotation that is automatically generated by the self-stabilized gimbal according to the sensed translation amount and/or rotation amount in order to stabilize the picture to be captured.

In an embodiment, the processing unit 124 may obtain an image captured by the first image capturing device 122 at the first time point according to the timestamp at the first time point. In an embodiment, according to the timestamp at the first time point, the image capturing apparatus 120, through the processing unit 124, reads the translation amount and/or rotation amount sensed by the inertia sensing device 126 corresponding to the first time point, and/or the position and/or direction of the image capturing apparatus 120 from the storage device. Also, according to the timestamp of the second time point, the image capturing apparatus 120 reads the translation amount and/or rotation amount sensed by the inertia sensing device 126 corresponding to the second time point, and/or the position and/or direction of the image capturing apparatus 120 from the storage device. Thereby, the image capturing apparatus 120 calculates and accumulates a relative translation relationship and/or a relative rotation relationship between the first image capturing device 122 at the first time point and the second image capturing device 123 at the second time point. For example, the processing unit 124 can calculate a relative translation relationship and/or a relative rotation relationship between the first image capturing device 122 at the first time point and the second image capturing device 123 at the second time point by means of integral calculation. In an embodiment, the second time point is the current time of the image capturing apparatus 120, and therefore the translation amount and/or rotation amount currently sensed by the inertial sensing device 126, and/or the position and/or direction of the image capturing apparatus 120 can be adopted. In an embodiment, the relative translation relationship T and the relative rotation relationship R between the first image capturing device 122 at the first time point and the second image capturing device 123 at the second time point can be calculated and generated by the following formula (1) and (2).

$$T=Ts+Td \quad \text{Formula (1)}$$

$$R=Rd\ Rs\ Re \quad \text{Formula (2)}$$

In step S4, the processing unit 124 calculates the distance of the local region A to be inspected relative to the first image capturing device 122 according to the control signal CS. In an embodiment, the control signal CS includes the coordinates and/or range of the local region A, which is selected by the user, in the inspection region image I1. The processing unit 124 may determine the spatial coordinate of the local region A relative to the second image capturing device 123 at the second time point according to the control signal CS.

Figure 6:
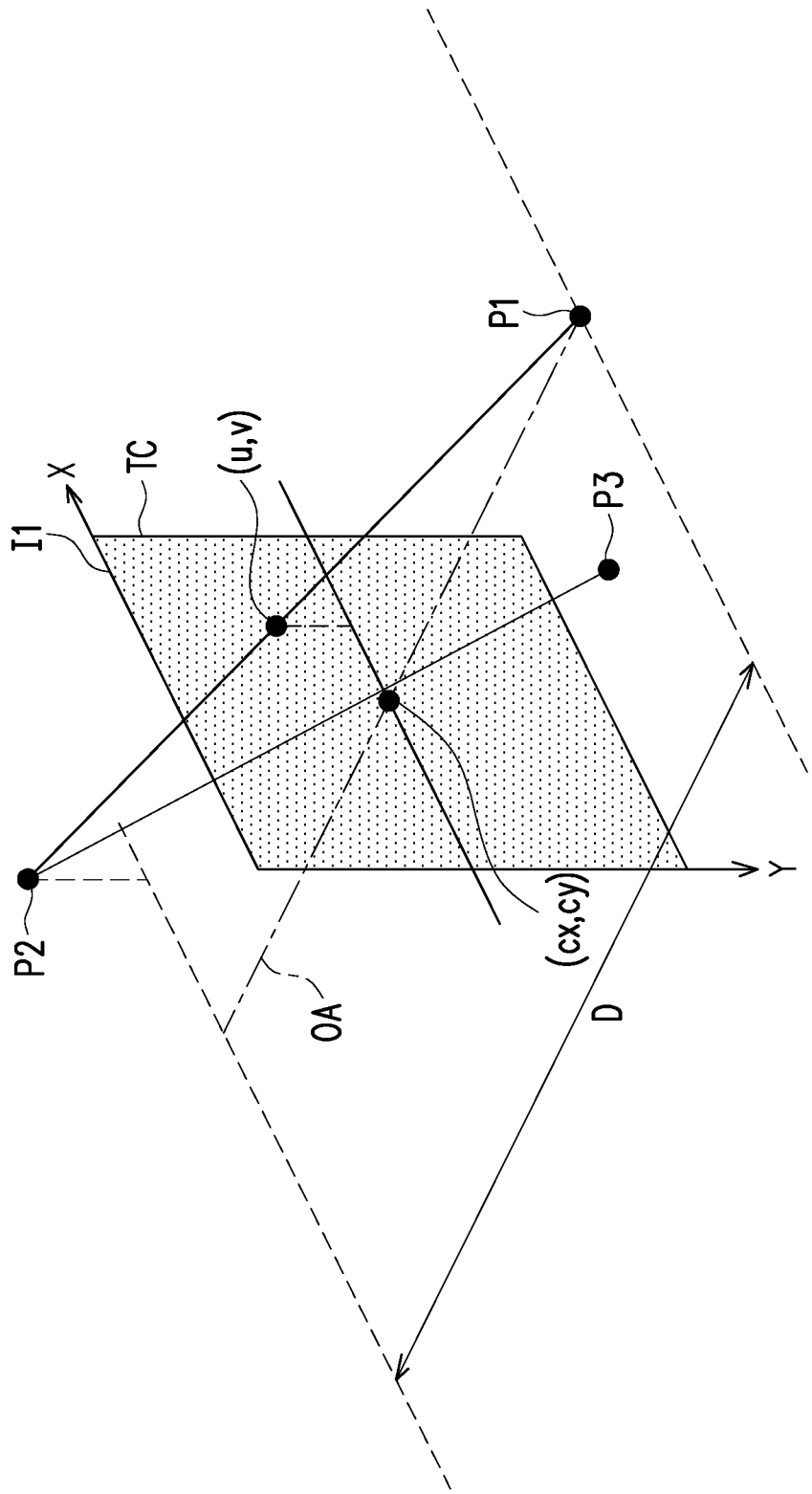
FIG. 6 illustrates the relationship between the plane coordinate and the three-dimensional space in the inspection region image in FIG. 5.

FIG. 6 illustrates the relationship between the plane coordinate and the three-dimensional space in the inspection region image I1 in FIG. 5. Position P1 in FIG. 6 represents the position of a point (such as the center or geometric center) of the first image capturing device 122 in the space at the first time point. Position P2 represents a point (such as the center or geometric center) of the local region A in the space. Position P3 represents the position of a point (such as the center or geometric center) of the second image capturing device 123 in the space at the second time point. The coordinate of one point of the local region A corresponding to the position P2 is position (u, v) in the image plane coordinate system TC. In an embodiment, the control signal CS includes the position (u, v). In an embodiment, the processing unit 124 estimates a distance between the position P1 of the first image capturing device 122 and the position P2 of the local region A along an axis (such as the optical axis OA) perpendicular to the image plane coordinate system TC (that is, the image plane coordinate system defined by axis X and axis Y in FIG. 6) as an estimated distance value D. A first three-dimensional coordinate value P''' of one point (for example, position P2) of the local region A relative to the first image capturing device 122 at the first time point is calculated through the following formula (3) according to the estimated distance value D and the position (u, v). In formula (3), x, y, and z represent the value of the first three-dimensional coordinate value P'''. In FIG. 6, the spatial coordinate uses P1 as the origin and the optical axis as the center of the coordinate. In this embodiment, the image coordinate uses the upper left corner of the image as the origin, and cx and cy are intrinsic parameters of the first image capturing device 122, which respectively represent the horizontal center point coordinate and the vertical center point coordinate of the first image capturing device 122, that is, the coordinate value of the optical axis OA in the image plane coordinate system TC. fx and fy are intrinsic parameters of the first image capturing device 122, which respectively represent the focal lengths of the first image capturing device 122 along the X-axis and Y-axis, z represents the direction perpendicular to the image plane coordinate system TC. The estimated distance value D is the distance between the position P2 and the position P1 in the z direction. In short, in step S4, the processing unit 124 calculates a first three-dimensional coordinate value P''' of one point (for example, position P2) of the local region A relative to the first image capturing device 122 at the first time point according to the position (u, v).

$$\begin{bmatrix} x \\ y \\ z \end{bmatrix} = z \begin{bmatrix} \frac{u - c_x}{f_x} \\ \frac{u - c_y}{f_y} \\ 1 \end{bmatrix}$$ Formula (3)

In step S5, for example, the following formula (4) is used to convert the first three-dimensional coordinate value P''' relative to the first image capturing device 122 at the first time point into a second three-dimensional coordinate value P' relative to the second image capturing device 123 at the second time point. Accordingly, the driving unit 125 can be driven according to the second three-dimensional coordinate value P' to rotate the second image capturing device 123, such that the local region A enters the field of view of the second image capturing device 123, and then the second image capturing device 123 is used to capture a local region image I2 of the local region A. Specifically, the relative translation relationship T and the relative rotation relationship R in the formula (4) may be the translation amount and/or rotation amount between the first image capturing device 122 at the first time point and the second image capturing device 123 at the second time point calculated through the formulas (1) and (2) in step S3. Through the conversion derived from formula (4), the processing unit 124 can convert the first three-dimensional coordinate value P''' of one point (for example, position P2) of the local region A relative to the first image capturing device 122 at the first time point to obtain a second three-dimensional coordinate value P' of one point (for example, position P2) of the local region A relative to the second image capturing device 123 at the second time point.

$$P' = RP''' + T$$ Formula (4)

In step S6, the processing unit 124 is used to instruct the driving unit 125 to rotate according to the calculation results obtained from steps S1 to S5, so that the local region A can enter the field of view of the second image capturing device 123.

In step S7, the second image capturing device 123 is used to capture the local region image I2 containing a part or all of the local region A. In an embodiment, the local region image I2 may include a part of the image of the local region A (for example, the left half or the lower half image of the local region A, or the middle region image of the local region A), or may include the whole image of the local region A (e.g., which is consistent with the image of local region A, or an image containing the local region A and outside the local region A). According to an embodiment of the disclosure, an image of a target to be inspected can be accurately captured. In an embodiment, after the local region A is brought into the field of view of the second image capturing device 123 in the manner described above, the field of view of the second image capturing device 123 can be narrowed by zoom-in so as to focus on the local region A as much as possible as long as that the local region A is not moved out from the field of view of the second image capturing device 123. In addition, other factors that may affect the accuracy of image capturing can be taken into consideration to further correct the second three-dimensional coordinate value P''', the disclosure provides no limitation thereto. For example, the factors that affect the accuracy of image capturing are, for example, lens radial distortion and tangential distortion caused by the use of a fisheye lens.

Figure 3B:
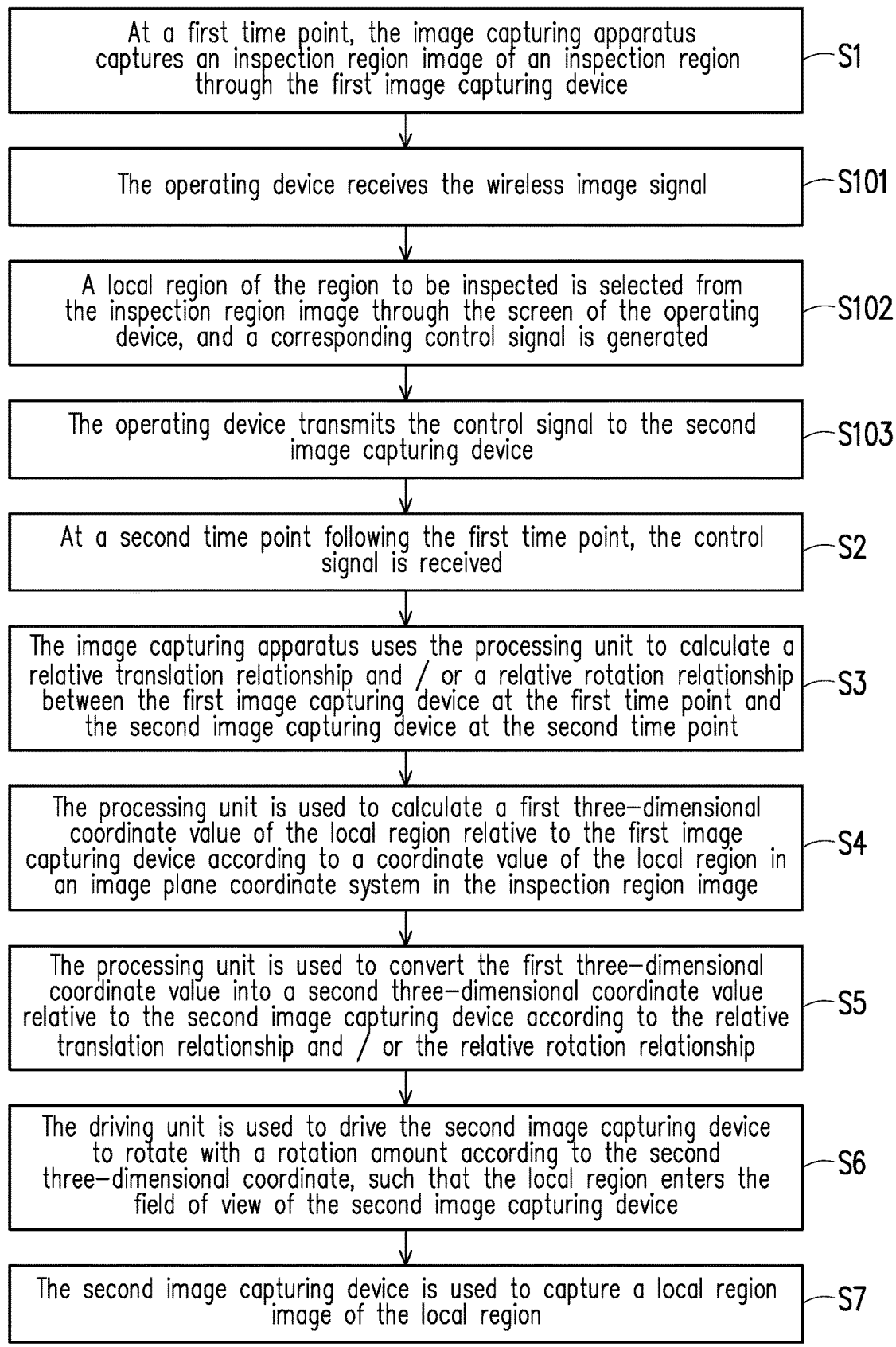
FIG. 3B is a flowchart of another image capturing method according to an embodiment of the disclosure.

Please refer to FIG. 3B. FIG. 3B is a flowchart of another image capturing method according to an embodiment of the disclosure. This image capturing method can be executed by the image capturing system 100 shown in FIG. 1. FIG. 3B is similar to FIG. 3A. The same steps and components are denoted by the same symbols. The image capturing method shown in FIG. 3B not only includes steps S1 to S7 performed by the image capturing apparatus 120, but also includes steps S101~S103 performed by the operating device 110 between steps S1 and S2.

In step S101, the operating device 110 receives the image signal IS transmitted by the image capturing apparatus 120, wherein the image signal IS includes the inspection region image I1 captured by the first image capturing device 122 at the first time point and a timestamp corresponding to the first time point. In step S102, a local region A of the region to be inspected is selected from the inspection region image I1 through the operating device 110 or the screen of the operating device 110, and a corresponding control signal CS is generated. The control signal CS includes the image features, coordinates and/or range of the selected local region A and the timestamp corresponding to the first time point. In step S103, the operating device 110 transmits the control signal CS to the second image capturing device 123. Therefore, in the subsequent steps S2 to S7, the image capturing apparatus 120 may receive the control signal CS transmitted by the operating device 110 and perform corresponding subsequent operations.

In an embodiment, the estimated distance value D in the above step S4 may result in an inaccurate second three-dimensional coordinate value P' calculated based on the estimation error. In an embodiment, it is possible to further determine whether the estimated distance value D and/or the second three-dimensional coordinate value P' is correct through an image feature matching step, and correct the estimated distance value D and/or the second three-dimensional coordinate value P' through the correction step.

Figure 7:
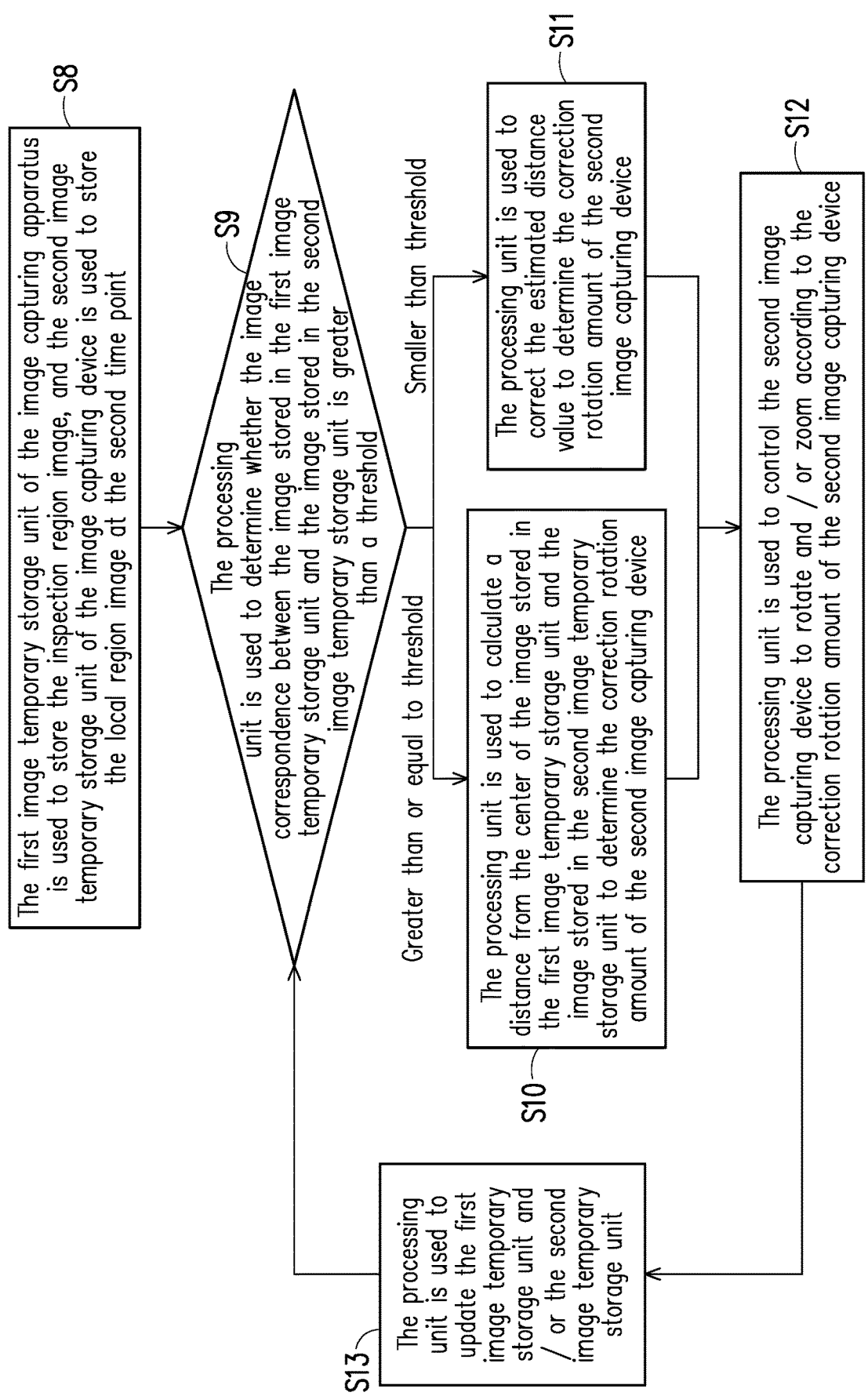
FIG. 7 is a flowchart of an image capturing method according to an embodiment of the disclosure.
Figure 8:
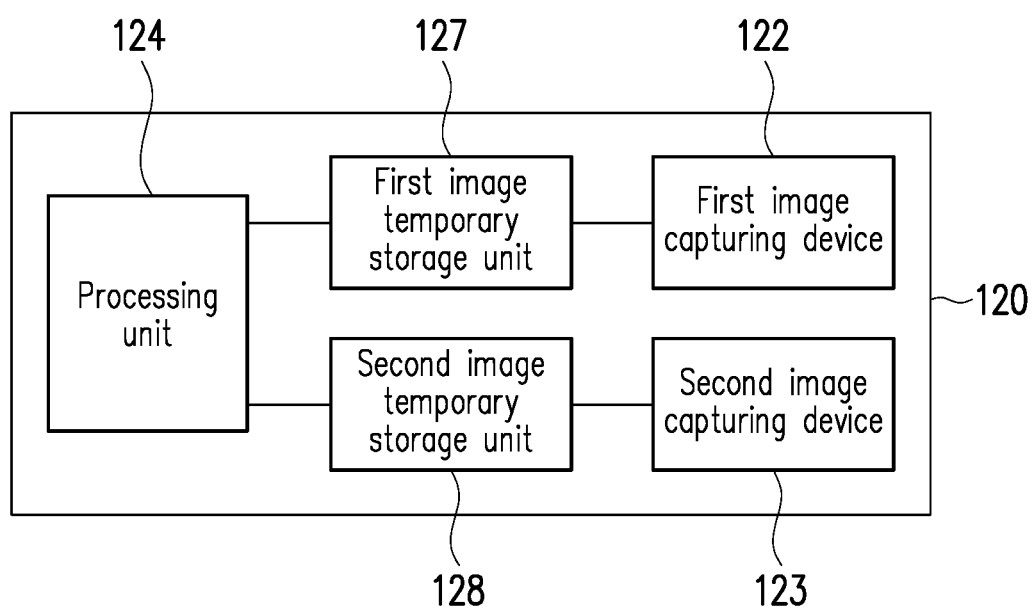
FIG. 8 is a schematic block diagram of some components of the image capturing apparatus of FIG. 1.

FIG. 7 is a flowchart of an image capturing method according to an embodiment of the disclosure. In an embodiment, FIG. 7 may follow step S7 of FIG. 3A and/or FIG. 3B. FIG. 8 is a schematic block diagram of some components of the image capturing apparatus of FIG. 1. In an embodiment, the first image temporary storage unit 127 and/or the second image temporary storage unit 128 may be configured in a storage device, or may be independent of the storage device. Please refer to FIG. 7 and FIG. 8, the first image temporary storage unit 127 of the image capturing apparatus 120 is used to store the inspection region image I1, and the second image temporary storage unit 128 of the image capturing apparatus 120 is used to store the local region image I2 at the second time point (step S8). In an embodiment, the first image temporary storage unit 127 stores the inspection region image I1 and the coordinate and/or range of the local region A in the inspection region image I1. In an embodiment, the first image temporary storage unit 127 stores the content of the local region A. The processing unit 124 is used to determine whether the image correspondence between the image stored in the first image temporary storage unit 127 and the image stored in the second image temporary storage unit 128 is greater than a threshold (step S9). In an embodiment, if the processing unit 124 determines that the image correspondence between the image stored in the first image temporary storage unit 127 and the image stored in the second image temporary storage unit 128 is greater than or equal to a threshold value, it is determined that the estimated distance D and/or the second three-dimensional coordinate value P' is close to the actual distance value, then the processing unit 124 is used to calculate a distance from the center of the image stored in the first image temporary storage unit 127 and the image stored in the second image temporary storage unit 128 to determine the correction rotation amount of the second image capturing device 123 (step S10). If the image correspondence between the image stored in the first image temporary storage unit 127 and the image stored in the second image temporary storage unit 128 is lower than the threshold, it is determined that the estimated distance value D and/or the second three-dimensional coordinate value P' deviate from the actual distance value, then the processing unit 124 is used to correct the estimated distance value D to determine the correction rotation amount of the second image capturing device 123 (step S11).

The processing unit 124 is used to control the second image capturing device 123 to rotate and/or zoom according to the correction rotation amount of the second image capturing device 123 (step S12). The processing unit 124 is used to update the first image temporary storage unit 127 and/or the second image temporary storage unit 128 (step S13).

In an embodiment, in step S9, the processing unit 124 may perform an image feature matching step on the image stored by the first image temporary storage unit 127 and the image stored by the second image temporary storage unit 128 to determine whether the image correspondence between the two is high or low. In an embodiment, the processing unit 124 may determine whether the image correspondence between the two is greater than or equal to a threshold, or is smaller than a threshold. For example, when the first image temporary storage unit 127 stores the inspection region image I1 and the second image temporary storage unit 128 stores the local region image I2, the processing unit 124 may determine whether the image correspondence between the local region A of the inspection region image I1 and the local region image I2 is greater than or equal to the threshold.

In an embodiment, the processing unit 124 determines the image correspondence between the inspection region image I1 in the first image temporary storage unit 127 and the local region image I2 in the second image temporary storage unit 128 through the following method. In the local region image I2 in the second image temporary unit 128, a search window is used to search for a region and a coordinate thereof (e.g., center coordinate) of which the image correspondence with the local region A of the inspection region image I1 is greater than the threshold, and the deviation between the estimated distance value D and the actual value is determined by determining the deviation of the searched coordinate from the center of the local region image I2.

In step S10, the processing unit 124 may perform a correction step based on a comparison result of the image correspondence between the image stored in the first image temporary storage unit 127 and the image stored in the second image temporary storage unit 128. For example, when the first image temporary storage unit 127 stores the inspection region image I1 and the second image temporary storage unit 128 stores the local region image I2, and the processing unit 124 determines that the image correspondence between the inspection region image I1 and the local region image I2 is greater than or equal to the threshold, the correction rotation amount is determined through determining the distance between a center coordinate of a corresponding local region A' (e.g., the region in the local region image I2 of which the image correspondence with the local region A of the inspection region image I1 is greater than threshold) searched from the local region image I2 and a center coordinate of the local region image I2. In an embodiment, after the distance between a center coordinate of the local region A' searched from the local region image I2 and a center coordinate of the local region image I2 is determined, an intrinsic parameter of the second image capture device 123, which is set or calibrated in advance, may be used to determine the correction rotation amount. Alternatively, in another embodiment, the processing unit 124 determines the correction rotation amount by determining the position of the image feature of the inspection region image I1 and the ratio of the image area in the local region image I2.

In step S11, the processing unit 124 can perform a correction step according to the feature watching result of the image correspondence. For example, when the first image temporary storage unit 127 stores the inspection region image I1 and the second image temporary storage unit 128 stores the local region image I2, and the processing unit 124 determines that the image correspondence between the inspection region image I1 and the local region image I2 is lower than the threshold, the processing unit 124 is used to correct the estimated distance value D. The first three-dimensional coordinate value P''' is corrected according to the corrected estimated distance value and the coordinate value, and the second three-dimensional coordinate value P' is corrected according to the corrected first three-dimensional coordinate value P''', and the processing unit 124 is used to determine the correction rotation amount according to the corrected second three-dimensional coordinate value P', and to instruct the driving unit 126 to rotate according to the correction rotation amount. Regarding the details of correcting the estimated distance value through the processing unit 124, the correction can be carried in a variety of different ways, the disclosure provides no limitation thereto. In an embodiment, after the rotation amount is corrected, the local region image I2 is obtained again, and calculation of the image correspondence between the images stored in the first image temporary storage unit 127 and the second image temporary storage unit 128 in step S9 and the following steps are repeated until the region having a correspondence greater than the threshold can be found in the search window of the local region image I2. The processing unit 124 can correct the estimated distance and the translation amount and/or rotation amount between the first image capturing device 122 and the second image capturing device 123 at the second time point according to the last used rotation amount and the center coordinate deviation of the correlated region found in the local region image I2. In an embodiment, the processing unit 124 uses the technology in the field of 3D reconstruction to correct the estimated distance value D. For example, the processing unit 124 may use any one or some of the following technologies, for example, correction stereo image estimation technology, video odometry technology, structure from motion (SfM) technology, extended Kalman filtering technology, visual synchronous positioning and visual slam technology to correct the estimated distance value D and the estimated translation amount and/or rotation amount. In an embodiment, the processing unit 124 can use a plurality of different estimated distance values in step S4 shown in FIG. 3A to correct the a plurality of first three-dimensional coordinate values P''', and use the plurality of corrected first three-dimensional coordinate values P''' in step S5 shown in FIG. 3A to correct a plurality of second three-dimensional coordinate values P', thereby determining the plurality of second three-dimensional coordinate values P' corresponding to the plurality of estimated distance values. Further, the processing unit 124 may determine which set of the plurality of second three-dimensional coordinate values P' of which the coordinate is close to the comparison result according to the image correspondence between the inspection region image I1 and the local region image I2, and determine the corrected second three-dimensional coordinate value P' through approximation, thereby determining the correction rotation amount of the second image capturing device 123. In an embodiment, it might also be that the photographing angle difference between the inspection region image I1 and the local region image I2 is excessively large and thus the image correspondence is low. Therefore, the processing unit 124 can also control the driving unit 125 to rotate according to a plurality of different preset rotation amounts, and photograph a corresponding local region image I2 at each preset rotation amount until the image correspondence is greater than or equal to the threshold. In an embodiment, it might also be that the difference in focal magnification of the second image capturing device 123 is too large, resulting in low image correspondence. Therefore, the processing unit 124 can also control the second image capturing device 123 to perform zooming according to a plurality of different preset focal lengths, and photograph a corresponding local region image I2 after each preset focal length is adjusted until the image correspondence is greater than or equal to the threshold. In an embodiment, the processing unit 124 may use visual inertial odometry technology to perform steps S3 to S5 as shown in FIG. 3A to correct the dynamic translation Td, the dynamic relative angle Rd and/or compensated rotation amount Re, thereby determining the corrected second three-dimensional coordinate value, and the estimated distance value is corrected accordingly. Therefore, the processing unit 124 can correct the estimated distance value in step S11, and then determine the correction rotation amount of the second image capturing device 123 accordingly.

In another embodiment, it is not limited that only one of step S10 and step S11 is selected to be carried out. The processing unit 124 may perform steps S10 and S11 in parallel or in sequence to calculate the correction rotation amount of the second image capturing device 123 in different ways simultaneously.

Then, the processing unit 124 is used to instruct the driving unit 125 to rotate and/or adjust the focal length of the second image capturing device 123 according to the correction rotation amount (step S12). In detail, the processing unit 124 instructs the driving unit 125 to rotate and photograph the corrected image I3 (not shown in the drawings of the disclosure) according to the correction rotation amount of the second image capturing device 123 determined in step S10 and/or step S11, and then determines the focal length of the second image capturing device 123. Regarding the details of determining the focal length of the second image capturing device 123 by the processing unit 124, the correction can be carried in a variety of different ways, and the disclosure provides no limitation thereto. In an embodiment, the processing unit 124 may determine the area of the local region A in the inspection region image I1 and the area of the local region A in the corrected image I3, and determine the focal length of the second image capturing device 123 according to the ratio between the two. In an embodiment, the processing unit 124 may determine the focal length of the second image capturing device 123 according to the corrected estimated distance value and the corrected second three-dimensional coordinate value.

Finally, in step S13, the processing unit 124 may update the data stored in the first image temporary storage unit 127 and/or the second image temporary storage unit 128 to perform the next image capturing operation. In an embodiment, the processing unit 124 may perform a zoom operation for the local region A. In order to obtain a zoomed image of the local region A, the processing unit 124 updates the first image temporary storage unit 127 and/or the second image temporary storage unit 128. In detail, the processing unit 124 may store the local region image I2, which is originally stored in the second image temporary storage unit 128, to the first image temporary storage unit 127, and store the image captured by the current (e.g., third time point following second time point) second image capturing device 123 into the second image temporary storage unit 128. For example, the second image capturing device 123 may capture an image with higher magnification for the local region A at the third time point. By recursively performing steps S9 to S13, the images of the local region A to be inspected with different magnifications and different photographing angles can be obtained more preferably. In an embodiment, the processing unit 124 may determine the corresponding second three-dimensional coordinate value according to the time change and translation amount and/or rotation amount of the main rigid body 121 sensed by the inertial sensing device 126 as well as steps S3 to S5 shown in FIG. 3A. After the processor 124 updates the first image temporary storage unit 127 and/or the second image temporary storage unit 128, the image capturing apparatus 120 may perform steps S9 to S13 to determine whether the image correspondence between the image captured by the second image capturing device 123 at the second time point and the image captured by the second image capturing device 123 at the third time point is greater than the threshold according to the image stored in the first image temporary storage unit 127 and the image stored in the second image temporary storage unit 128. In this manner, the image capturing apparatus 120 can determine the correction rotation amount of the second image capturing device 123 through step S10 and/or step S11, and photograph the same or different regions to be inspected through step S12. In an embodiment, the processing unit 124 may update the first image temporary storage unit 127 and/or the second image temporary storage unit 128 when it is determined that a preset interval has elapsed. In an embodiment, the processing unit 124 may update the first image temporary storage unit 127 and/or the second image temporary storage unit 128 when the inertial sensing device 126 senses that the translation amount and/or rotation amount of the main rigid body 121 is greater than the preset translation amount and/or the preset rotation amount. In short, through the operation of updating the first image temporary storage unit 127 and the second image temporary storage unit 128 described above, the image capturing apparatus 120 can continuously photograph the local region A of the inspection region image I1 selected by the user. The user can continuously inspect the local region A. Alternatively, the image capturing apparatus 120 can be zoomed into the local region A according to the user's instruction, so that the user can inspect the clearer image of the local region A. A plurality of intrinsic parameters corresponding to a plurality of zoom-in steps for zooming into the local region A can be set of calibrated in advance.

In an embodiment, the first image temporary storage unit 127 and the second image temporary storage unit 128, which may be a memory or other appropriate forms, may be included in the processing unit 124. In addition, the processing unit 124 may further include a temporary storage space corresponding to the first image capturing device 122 and a temporary storage space corresponding to the second image capturing device 123, respectively, for storing the images captured by the first image capturing device 122 and the second image capturing device 123 in a time segment.

For instance, the processing unit 124 may include, for example, a central processing unit (CPU), or other programmable general-purpose or specific-purpose micro control unit (MCU), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA) or other similar components or a combination of the above components.

The first image temporary storage unit 127 and the second image temporary storage unit 128 may be two memory devices separately provided, or the first image temporary storage unit 127 and the second image temporary storage unit 128 may be a single memory device configured in an integrated manner. For instance, the first image temporary storage unit 127 and the second image temporary storage unit 128 may be, for example, any type of fixed or removable random access memory (RAM), read-only memory (ROM), flash memory, hard disk drive (HDD), solid state drive (SSD), or similar components or a combination of the above components for storing multiple modules, various applications or various programs executable by the processing unit 124.

For instance, the inertial sensing device 126 may be, for example, an acceleration sensor, an angular velocity sensor, a magnetic induction sensor, an accelerometer, a three-axis gyroscope, a six-axis gyroscope, a magnetometer or the like or a combination of the above to sense changes in position and angle.

Based on the above, the image capturing method and the image capturing apparatus use the translation amount and/or rotation amount generated by the second image capturing device at the second time point relative to the first image capturing device at the first time point as a parameter, and uses this parameter to calculate the three-dimensional coordinate value of the target to be inspected (that is, the local region) in the space, thereby compensating for the error of the three-dimensional coordinate value caused by the translation amount and/or the rotation amount generated in the elapsed time duration (for example, the time delay results from transmitting the control signal) from the first time point to the second time point. In this manner, the unexpected translation amount and/or rotation amount caused by environmental factors such as wind and/or mechanical vibration results from the image capturing apparatus itself can be corrected so that the accuracy of the position of the image capturing apparatus can be maintained.

What is claimed is:

1. An image capturing method adapted for an image capturing device, comprising:

capturing an inspection region image of an inspection region by a first image capturing device at a first time point;

receiving a control signal at a second time point following the first time point, the control signal corresponding to a local region in the inspection region image;

calculating, by a processing unit, at least one of a relative translation relationship and a relative rotation relationship between the first image capturing device at the first time point and a second image capturing device at the second time point;

calculating, by the processing unit, a first three-dimensional coordinate value of the local region relative to the first image capturing device at the first time point according to the control signal, and converting the first three-dimensional coordinate value into a second three-dimensional coordinate value relative to the second image capturing device at the second time point according to at least one of the relative translation relationship and the relative rotation relationship;

driving, by a driving unit, the second image capturing device to rotate with a rotation amount according to the second three-dimensional coordinate value; and capturing a local region image of the local region by the second image capturing device, wherein the step of calculating the first three-dimensional coordinate value comprises:

estimating a distance between the first image capturing device at the first time point and a point in the local region along an axis perpendicular to an image plane coordinate system where the inspection region image is located as an estimated distance value; and calculating the first three-dimensional coordinate value of the point in the local region relative to the first image capturing device according to the estimated distance value and a coordinate value of the point in the local region in the image plane coordinate system, wherein the image capturing method further comprises an image feature matching step, comprising:

storing the inspection region image at the first time point by a first image temporary storage unit, and storing the local region image at the second time point by a second image temporary storage unit; and determining, by the processing unit, whether an image correspondence between the inspection region image in the first image temporary storage unit and the local region image at the second time point in the second image temporary storage unit is greater than a threshold, wherein the image capturing method further comprises a correction step, comprising:

correcting the estimated distance value by the processing unit when the image correspondence between the inspection region image in the first image temporary storage unit and the local region image at the second time point in the second image temporary storage unit is smaller than the threshold;

correcting the first three-dimensional coordinate value according to the corrected estimated distance value and the coordinate value of the point in the local region in the image plane coordinate system;

correcting the second three-dimensional coordinate value according to the corrected first three-dimensional coordinate value; and determining, by the processing unit, a correction rotation amount according to the corrected second three-dimensional coordinate value, and instructing the driving unit to rotate the second image capturing device according to the correction rotation amount.

2. The image capturing method of claim 1, wherein the first image capturing device and the second image capturing device are mounted on a flying vehicle, and the step of calculating at least one of the relative translation relationship and the relative rotation relationship comprises:

calculating at least one of the relative translation relationship and the relative rotation relationship according to at least one of a relative position and a relative angle of the first image capturing device and the second image capturing device on the flying vehicle and according to at least one of a translation amount and a rotation amount of the flying vehicle from the first time point to the second time point.

3. The image capturing method of claim 2, wherein the first image capturing device is mounted on a main body of the flying vehicle, and the second image capturing device is mounted on a self-stabilized device of the flying vehicle, the self-stabilized device is adapted to generate a compensated rotation amount according to a partial rotation amount of the main body, wherein the step of calculating at least one of the relative translation relationship and the relative rotation relationship further comprises:

calculating at least one of the relative translation relationship and the relative rotation relationship according to the compensated rotation amount.

4. The image capturing method of claim 1, further comprising:

capturing another local region image of the local region by the second image capturing device at a third time point;

storing the local region image by the first image temporary storage unit, and storing the another local region image by the second image temporary storage unit;

calculating, by the processing unit, at least one of another relative translation relationship and another relative rotation relationship between the second image capturing device at the second time point and the second image capturing device at the third time point following the second time point;

determining, by the processing unit, whether another image correspondence between the local region image in the first image temporary storage unit and the another local region image in the second image temporary storage unit is greater than the threshold; and determining another correction rotation amount by the processing unit according to at least one of the another relative translation relationship and the another relative rotation relationship of the second image capturing device, and according to whether the another image correspondence between the local region image in the first image temporary storage unit and the another local region image in the second image temporary storage unit is greater than the threshold, and instructing the driving unit to rotate the second image capturing device according to the another correction rotation amount.

5. The image capturing method of claim 1, further comprising a correction step, wherein the correction step comprises:

when the image correspondence between the inspection region image in the first image temporary storage unit and the local region image at the second time point in the second image temporary storage unit is greater than or equal to the threshold, calculating, by the processing unit, a distance from a center of a corresponding local region in the local region image to a center of the local region image to determine a correction rotation amount, and instructing the driving unit to rotate the second image capturing device according to the correction rotation amount, wherein the corresponding local region in the local region image is a region in the local region where the image correspondence is greater than or equal to the threshold.

6. The image capturing method of claim 1, wherein the step of calculating the first three-dimensional coordinate value comprises:

calculating, by the processing unit, the first three-dimensional coordinate value of the local region relative to the first image capturing device according to a coordinate value of the local region in an image plane coordinate system.

7. The image capturing method of claim 1, wherein the control signal comprises a timestamp corresponding to the first time point and an image feature of the local region.

8. An image capturing apparatus, comprising:

a first image capturing device adapted to capture an inspection region image in an inspection region at a first time point;

a second image capturing device;

a processing unit adapted to calculate at least one of a relative translation relationship and a relative rotation relationship between the first image capturing device at the first time point and the second image capturing device at a second time point, wherein the processing unit is adapted to receive a control signal at the second tune point following the first time point, the control signal corresponds to a local region in the inspection region image, and the processing unit is adapted to calculate a first three-dimensional coordinate value of the local region relative to the first image capturing device at the first time point according to the control signal and convert the first three-dimensional coordinate value into a second three-dimensional coordinate value relative to the second image capturing device at the second time point according to at least one of the relative translation relationship and the relative rotation relationship; and a driving unit adapted to drive the second image capturing device to rotate with a rotation amount according to the second three-dimensional coordinate value, wherein, after the driving unit drives the second image capturing device to rotate with the rotation amount, the second image capturing device is adapted to capture a local region image of the local region, wherein the processing unit is adapted to estimate a distance between the first image capturing device at the first time point and a point in the local region along an axis perpendicular to an image plane coordinate system where the inspection region image is located as an estimated distance value, and is adapted to calculate the first three-dimensional coordinate value of the point in the local region relative to the first image capturing device according to the estimated distance value and a coordinate value of the point in the local region in the image plane coordinate system, wherein the image capturing apparatus further comprises a first image temporary storage unit and a second image temporary storage unit, the first image temporary storage unit is adapted to store the inspection region image at the first time point, the second image temporary storage unit is adapted to store the local region image at the second time point, and the processing unit is adapted to determine whether an image correspondence between the inspection region image in the first image temporary storage unit and the local region image at the second time point in the second image temporary storage unit is greater than a threshold, wherein when the image correspondence between the inspection region image in the first image temporary storage unit and the local region image at the second time point in the second image temporary storage unit is smaller than the threshold, the processing unit is adapted to correct the estimated distance value, and is adapted to correct the first three-dimensional coordinate value according to the corrected estimated distance value and the coordinate value of the point in the local region in the image plane coordinate system, and is adapted to correct the second three-dimensional coordinate value according to the corrected first three-dimensional coordinate value, and the processing unit is adapted to determine a correction rotation amount according to the corrected second three-dimensional coordinate value, and the driving unit is adapted to rotate the second image capturing device according to the correction rotation amount.

9. The image capturing apparatus of claim 8, comprising a flying vehicle, wherein the first image capturing device and the second image capturing device are mounted on the flying vehicle, and the processing unit is adapted to calculate at least one of the relative translation relationship and the relative rotation relationship according to at least one of a relative position and a relative angle of the first image capturing device and the second image capturing device on the flying vehicle and according to at least one of a translation amount and a rotation amount of the flying vehicle from the first time point to the second time point.

10. The image capturing apparatus of claim 9, wherein the flying vehicle comprises a main body and a self-stabilized device, the first image capturing device is mounted on the main body, and the second image capturing device is mounted on the self-stabilized device, and the self-stabilized device is adapted to generate a compensated rotation amount according to a partial rotation amount of the main body, wherein the processing unit is adapted to calculate at least one of the relative translation relationship and the relative rotation relationship according to the compensated rotation amount.

11. The image capturing apparatus of claim 8, wherein at a third time point, the second image capturing device is adapted to capture another local region image of the local region, the first image temporary storage unit is adapted to store the local region image, the second image temporary storage unit is adapted to store the another local region image, the processing unit is adapted to calculate at least one of another relative translation relationship and another relative rotation relationship between the second image capturing device and the second time point and the second image capturing device at the third time point following the second time point, the processing unit is adapted to determine whether another image correspondence between the local region image in the first image temporary storage unit and the another local region image in the second image temporary storage unit is greater than the threshold, and the processing unit is adapted to determine another correction rotation amount according to at least one of the another relative translation relationship and the another relative rotation relationship of the second image capturing device, and according to whether the another image correspondence between the local region image in the first image temporary storage unit and the another local region image in the second image temporary storage unit is greater than the threshold, and instruct the driving unit to rotate the second image capturing device according to the another correction rotation amount.

12. The image capturing apparatus of claim 8, wherein when the image correspondence between the inspection region image in the first image temporary storage unit and the local region image at the second time point in the second image temporary storage unit is greater than or equal to the threshold, the processing unit is adapted to calculate a distance from a center of a corresponding local region in the local region image to a center of the local region image to determine a correction rotation amount, and the driving unit is adapted to rotate the second image capturing device according to the correction rotation amount, wherein the corresponding local region in the local region image is a region in the local region where the image correspondence is greater than or equal to the threshold.

13. The image capturing apparatus of claim 8, wherein the processing unit is adapted to calculate the first three-dimensional coordinate value of the local region relative to the first image capturing device according to a coordinate value of the local region in an image plane coordinate system.

14. The image capturing apparatus of claim 8, wherein the control signal comprises a timestamp corresponding to the first time point and an image feature of the local region.

* * * * *